Nov. 18, 1930.                L. E. WILLIAMS                1,781,713
DEMOUNTABLE COVER FOR DUMPING BODIES
Filed Dec. 23, 1927
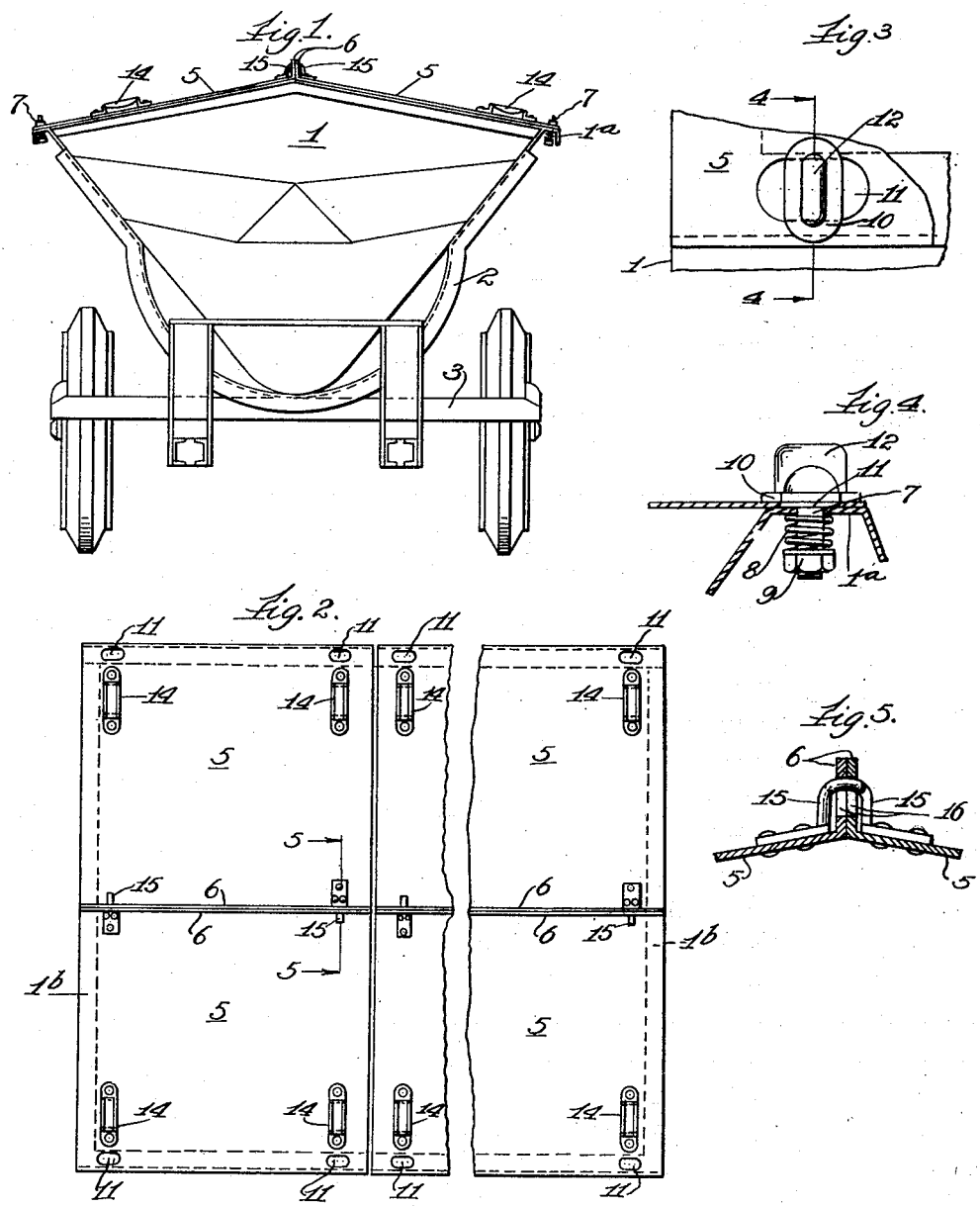
Inventor.
Leroy E. Williams.
by his Attorneys.
Witness.

Patented Nov. 18, 1930

1,781,713

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

DEMOUNTABLE COVER FOR DUMPING BODIES

Application filed December 23, 1927. Serial No. 242,021.

This invention relates to dump body vehicles of the type employed for refuse collection and similar purposes, in which the body is mounted for rolling or tilting laterally to discharge its load, and more particularly to means for covering such a vehicle body. The primary object of the present invention is to provide a cover of simplified construction that may be detachably mounted on the body for quick removal to permit free and unobstructed dumping action of the body. Another object is to provide a cover of improved construction, in which portions of the cover may be manipulated for partially exposing the load-carrying space of the body. It consists in certain features and elements of construction herein shown and described, as indicated by the claim.

In the drawings:

Figure 1 is a diagrammatic end elevation of a dump body vehicle provided with covers embodying the present invention.

Figure 2 is a plan view of the improved cover as mounted on a vehicle body.

Figure 3 is an enlarged fragmentary detail of a fastening member for securing the edges of the cover to the body.

Figure 4 is a transverse vertical section through cover fastening member, taken as indicated by line 4—4 on Figure 3.

Figure 5 is a partial vertical section taken at line 5—5, Figure 2, showing the guiding and locking construction of a pair of co-operating cover sections.

The dumping body vehicle as illustrated in the drawings is of a conventional construction and includes an upwardly open hopper body, 1, mounted on curved rockers, 2, which are carried on transverse rails, 3, of the vehicle frame, to permit the body to be rolled laterally to either side for discharging its load. The cover for the body is completely demountable therefrom so that the body may be rolled laterally to dumping position and will return under control of its normal center of gravity. It will be understood that the body is held in upright position by locking mechanism of the usual construction (not shown) which forms no part of this invention.

The cover for enclosing the load-carrying space of the body comprises a plurality of sections, 5, preferably of sheet metal, arranged in pairs and extending transversely of the body. For relatively short length bodies one pair of cover sections might suffice. The cover sections of each pair are provided with upwardly extending flanges, 6, for impinging against each other in a wedging manner as shown in Figure 5. To maintain the cover sections of the pairs in body-covering position the outer edges of said sections are secured to the flanged edges, 1ª, of the body by yielding fastening buttons, each comprising a bolt, 7, extending through the body flange, 1ª, with a spring, 8, interposed between the underside of said flange and a nut, 9; an oblong shoulder, 10, on said bolt faces toward the upper side of the flange and is adapted to register with a slotted aperture, 11, in the edge of the cover section. A flattened head, 12, is provided above the shoulder, for yieldingly drawing the shoulder, 10, through the registered aperture of the cover section, and turning the bolt for locking said cover section to the flanged edge of the body. (See Figure 3.)

In mounting or demounting the cover on the body an operator will be required for manipulating each of the cover sections of the pair and for convenience, a pair of handles, 14, are provided on each cover section. When mounting the cover on the body, the sections of each pair are first aligned on the fastening buttons on the edge of the body, then the opposite or inner ends are gradually lowered until the flanges, 6, of said sections abut each other and wedge into a rigid supporting position; the fastening buttons are then turned to lock the cover sections in place. In removing the cover from the body, the procedure is reversed. It will be understood that these cover sections are so designed with respect to the body that in body covering position they are, at all times, inclined upwardly toward the center of the body. The angle of inclination of the cover sections may be varied to suit the type of body, but in all cases the angle formed between the cover sections when mounted, must be less than a straight angle.

The cover sections of each pair are provided with oppositely extending dogs, 15, secured to the top of said sections and extending through the flanges, 6, each adapted to be engaged in a corresponding aperture, 16, of the flange of the opposite cover section for aligning said co-operating cover sections as they approach their wedging position. Further, these dogs lock the cover sections of each pair in body covering position. While standing still, the wedging of the covers would be sufficient to maintain the cover sections in position, but on the road the vibrations would be apt to jar one section upwardly, thus allowing the other section to drop downwardly out of engagement with its mate, but this possibility is entirely obviated by the interlocking dogs. Of course the pair of cover sections at each end of the body are partially supported on the flange, $1^b$, on the end of the body, but the cover sections of the intermediate pairs must rely for support entirely on the wedging engagement of their flanges.

I claim:

In combination with an upwardly open vehicle body, a removable cover comprising a plurality of sections disposed in pairs including a pair of sections adjacent each end of the body and one or more intermediate pairs independent of and unconnected with said end sections, the sections of each pair being detachably secured to opposite edges of the body respectively and sloping upwardly therefrom toward each other, the upper edges of said sections being provided with vertical flanges for mutual abutment and having inter-engaging features associated with said flanges opposing slippage of one flange vertically with respect to the other, whereby the covers are substantially self-sustaining and the intermediate sections require no auxiliary supports extending over the load-carrying space of the body.

LEROY E. WILLIAMS.